3,330,872
FLUORINE-CONTAINING HEMIKETALS
William E. Weesner, Kettering, Ohio, assignor to Monsanto Research Corporation, St. Louis, Mo., a corporation of Delaware
No Drawing. Filed Apr. 28, 1966, Ser. No. 545,856
7 Claims. (Cl. 260—615)

This invention relates to fluorine-containing organic compounds and more particularly provides a new and valuable class of fluorine-containing hemiketals, the method of preparing the same, and the use of these compounds in preparing functional fluids.

According to the invention, the fluorine-containing hemiketals are prepared by the reaction of a fluoroketone with a glycol as shown in the following equations to yield respectively a mono hemiketal or a bis hemiketal.

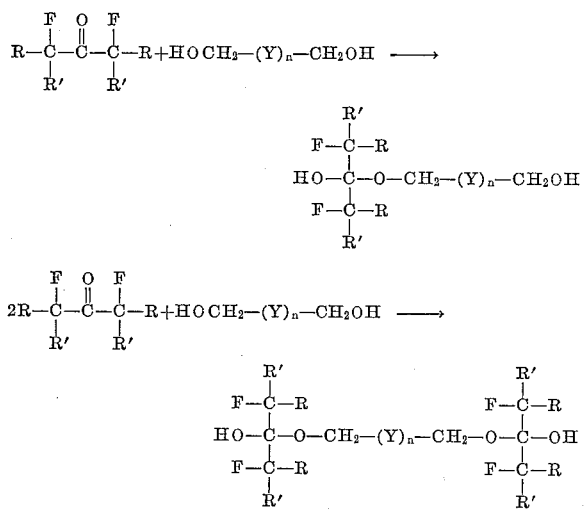

wherein R is selected from the class consisting of hydrogen and fluorine; R' is selected from the class consisting of hydrogen, fluorine, alkyl and fluorine-substituted alkyl radicals; Y is selected from the class consisting of hydrocarbyl and halogen-substituted hydrocarbyl radicals; and $n$ is an integer of from 1 to 8.

Whether a mono hemiketal or a bis hemiketal is obtained depends upon the proportion of the fluoroketone to the glycol as shown by the above equations.

The compounds provided by this invention therefore may be represented by the formula

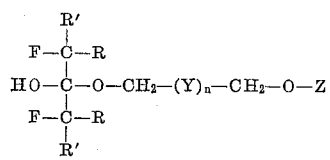

wherein Z is selected from the class consisting of hydrogen and

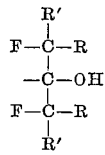

and $n$ is an integer of from 1 to 8.

Presently useful fluoroketones are:

1,3-difluoro-2-propanone,
1,1,3,3-tetrafluoro-2-propanone,
1,1,1,3,3,3-hexafluoro-2-propanone,
2,4-difluoro-3-pentanone,
1,1,1,2,2,4,4,5,5,5-decafluoro-3-pentanone.

Presently useful glycols are:

1,4-butanediol,
1,5-pentanediol,
1,8-octanediol,
1,10-decanediol,
2,3-dibromo-1,4-butanediol,
2,2,3,3-tetrachloro-1,4-butanediol,
2,2,3,3,4,4-hexafluoro-1,5-pentanediol,
2,5-dibromo-1,6-hexanediol,
2,3,4,5-tetrachloro-1,6-hexanediol,
3,4-diiodo-1,6-hexanediol,
2,2,3,3,4,4,5,5-octafluoro-1,6-hexanediol,
2,3,4,5,6,7,8-heptachloro-1,9-nonanediol,
2,2,3,3,4,4,5,5,6,6,7,7,8,8,9,9-hexadecafluoro-1,10-decanediol p-xylenediol.

Reaction of the fluoroketone with a glycol to give the presently provided fluorine-containing hemiketals is conducted by simply mixing the two reactants in a suitable solvent until formation of said hemiketal is completed. As solvent there may be used benzene, toluene, xylene, etc.

The formation of monohemiketals takes place by reaction of one mole of the fluoroketone with one mole of the glycol. A deficiency of the fluoroketone may be employed, however, without deleterious results; the excess glycol is readily separated from the product at the conclusion of the reaction. The formation of bis hemiketals takes place by reaction of two moles of the fluoroketone with one mole of the glycol. An excess of the fluoroketone may be employed if desired. When a ratio of between 1:1 and 2:1 moles of fluoroketone to glycol is employed, the product consists of a mixture of the mono and bis hemiketals which may be separated by any of several methods including distillation, solvent extraction, chromatography, etc.

Generally the reaction is exothermic; hence, heating is usually not required and the reaction may be conducted by operating at ambient temperatures, or even with cooling. However, to shorten the reaction time and to achieve maximum production for a given size reaction vessel, it may be desirable to supply heat. Temperatures of from, say, 30° C. to 85° C. are thus useful.

The reaction may either be conducted at atmospheric pressure, as by bubbling the fluoroketone through the glycol or by contacting the gaseous and liquid reactants with vigorous stirring, or may be conducted at pressures greater than atmospheric in a suitable pressurized vessel preferably provided with a shaking or stirring mechanism.

Catalysts may be employed to hasten the reaction between the fluoroketone and the glycol, and for this purpose acids are useful. Thus, there may be used phosphoric acid, p-toluene-sulfonic acid, etc.

The fluorine-containing hemiketals are generally liquids which are usually soluble in organic solvents such as benzene, dimethylformamide, etc.

The present hemiketals are useful as solvents, humectants, and chemical intermediates. By virtue of their terminal hydroxy groups they may be further esterified with organic acids, acyl halides or acid anhydrides, e.g., to form esters of the formula

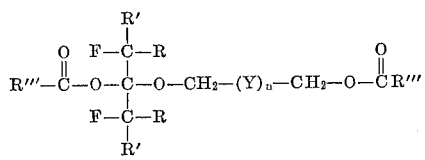

and

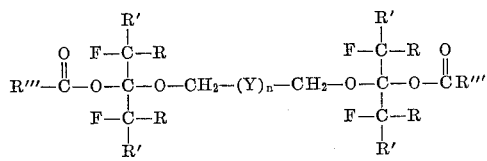

wherein R, R', Y and $n$ are as defined above and R''' is hydrocarbyl.

By reaction with alkylating reagents, e.g., diazomethane or dimethyl sulfate, alkoxy ethers may be obtained, e.g.,

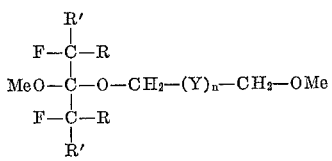

and

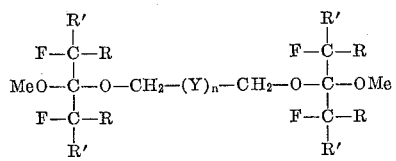

By reaction with difunctional acids, acyl halides or acid anhydrides, e.g., phthalic anhydride, linear polyesters are formed.

By reaction with disocyanates, e.g., 2,4-tolylene diisocyanate, linear polyurethanes are formed. For this purpose, either the mono or bis hemiketals are useful.

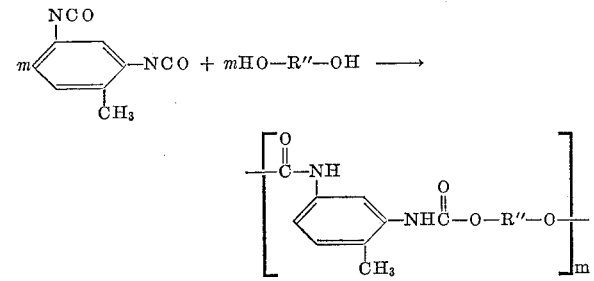

where R'' is selected from the class consisting of

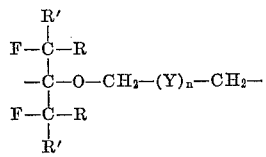

and

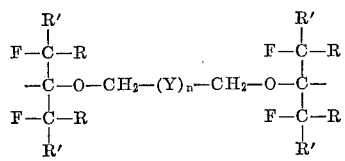

where R, R', Y and $n$ are as defined above and $m$ is an integer of from 1 to 20.

Depending upon the ratio of hemiketal to diisocyanate employed, the polymer may have predominately terminal hydroxy groups or terminal isocyanate groups, or may have both hydroxy and isocyanate groups. Mixtures of the hemiketals may be employed, as for example, the crude mixture obtained from the reaction of hexafluoroacetone with a glycol without further separation. The polymers so obtained are useful as functional fluids for hydraulic systems or as lubricants. By virtue of their fluorine content they have relatively low flammability.

The invention is further illustrated by, but not limited to, the following examples.

*Example 1*

This example illustrates the preparation of a bis hemiketal from 1,6-hexanediol.

A slurry of 23.6 g. (0.2 mole) of 1,6-hexanediol, 0.3 g. p-toluenesulfonic acid monohydrate and 500 ml. of benzene was warmed to 50° C. This gave two liquid phases as the diol did not completely disolve. Hexafluoroacetone was then bubbled in over 7.5 hours at 50–51° C. A clear solution resulted after 3 hours. The weight gain was 65.2 g. (0.392 mole as hexafluoroacetone). The p-toluenesulfonic acid was neutralized with 0.2 g. sodium bicarbonate. Benzene was removed under reduced pressure at 43–45° C. leaving 89 g. of bis hemiketal as a liquid residue.

*Example 2*

This example illustrates the preparation of a bis hemiketal from 2,2,3,3,4,4-hexafluoro-1,5-pentanediol.

A slurry of 31.8 g. (0.15 mole) of 2,2,3,3,4,4-hexafluoro-1,5-pentanediol, 0.3 g. p-toluenesulfonic acid monohydrate and 500 ml. of benzene was warmed to 40–45° C. Hexafluoroacetone was then bubbled in over a 15-hour period. The weight gain was 45.3 g. (0.272 mole as hexafluoroacetone). Benzene was removed at 40–45° C. under reduced pressure leaving a liquid residue of 79 g. Upon fractionation there was obtained a cut corresponding to the expected bis ketal, $n_D^{25}=1.3252$, B.P. 82–84° C./1.2 mm. It analyzed as follows:

| Percent | Found | Calcd. for $C_{11}H_6F_{18}O_4$ |
|---|---|---|
| C | 23.61 | 24.28 |
| H | 1.35 | 1.11 |
| F | 63.06 | 62.85 |

This then, establishes that the product was 1,1,9,9-tetrakis-(trifluoromethyl)-2,8-dioxa-4,4,5,5,6,6 - hexafluoro-1,9-nonanediol.

*Example 3*

This example illustrates the preparation of a polyurethane polymer having predominately terminal hydroxy groups.

A solution of 20.5 g. of the product from the reaction of 1,6-hexanediol and hexafluoroacetone, consisting essentially of a 50–50 mixture of the mono and bis hemiketals, in 75 ml. of dimethylformamide was treated with 9.0 g. of 2,4-tolylene diisocyanate over 8 minutes at 29–30° C. This solution stood at room temperature under nitrogen for 65 hours and was then heated at 38–40° C. for 24 hours. An additional 1.2 g. of toluene diisocyanate was added and heating done at 42° C. for 26 hours longer. Then 0.1 ml. of water was added and heating continued at 42° C. for 2 hours longer. Solvent was removed under reduced pressure at 48–50° C., leaving the product as a yellow, very viscous liquid, 27.5 g. Infrared spectroscopic analysis showed the absence of isocyanate groups. The liquid polyurethane product was useful as a functional fluid and had a relatively low flammability.

*Example 4*

This example illustrates the preparation of a polyurethane polymer having both hydroxy and isocyanate groups as terminal groups.

A solution of the bis hemiketal obtained in Example 2 is reacted in dimethylformamide with a substantially stoichiometrically equivalent amount of 2,4-tolylene diisocyanate at about 30° C. for 65 hours and then at about 40° C. for 24 hours. Solvent is removed under reduced pressure, leaving the polyurethane polymer as a viscous liquid having both hydroxy and isocyanate groups as terminal groups.

The polymer is useful for forming tough, wel-bonded coatings, and may be cured by reaction with atmospheric moisture. The polymer is shown to have elastomeric properties.

*Example 5*

This example illustrates the preparation of a polyurethane polymer having predominately terminal isocyanate groups.

A solution of the bis hemiketal obtained in Example 2 is reacted in dimethylformamide with excess 2,4-tolylene diisocyanate. The reaction is first conducted at about 30° C. for 60 hours, then at about 45° C. for 30 hours. Solvent is removed under reduced pressure, leaving the polyurethane polymer as a viscous liquid having predominately isocyanate end groups. A foam is obtained by adding a foaming agent, e.g., water, together with a surface active agent, amine catalyst and plasticizer.

It is to be understood that although the invention has been described with specific reference to particular embodiments thereof, it is not to be so limited since changes and alterations therein may be made which are within the full intended scope of this invention as defined by the appended claims.

What is claimed is:

1. A fluorine-containing hemiketal of the formula

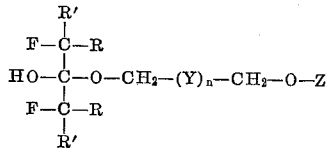

wherein R is selected from the class consisting of hydrogen and fluorine; R' is selected from the class consisting of hydrogen, fluorine, methyl and fluorine-substituted methyl radicals; Y is selected from the class consisting of hydrocarbyl and halogen-substituted hydrocarbyl radicals; Z is selected from the class consisting of hydrogen and

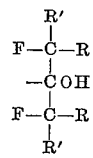

and $n$ in an integer of from 1 to 8.

2. A compound as described in claim 1, where R and R' are fluorine, Y is methylene and Z is

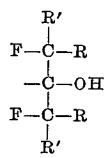

3. A compound as described in claim 1 where R and R' are fluorine, Y is methylene and Z is hydrogen.

4. A compound as described in claim 1 where R and R' are fluorine, Y is difluoromethylene and Z is

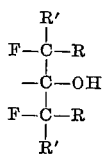

5. A compound as described in claim 2 where $n$ is 4.
6. A compound as described in claim 3 where $n$ is 4.
7. A compound as described in claim 4 where $n$ is 3.

References Cited

UNITED STATES PATENTS 2,245,260   6/1941   Dickey et al. _____ 260—615
2,931,838   6/1960   Christensen _____ 260—615

LEON ZITVER, *Primary Examiner.*

H. MARS, *Assistant Examiner.*